July 17, 1956  C. C. WAUGH  2,755,387
GROUND INDICATOR FOR CALUTRONS
Filed Dec. 5, 1944  2 Sheets-Sheet 1

INVENTOR.
Charles C. Waugh
BY
Robert A. [signature]

July 17, 1956     C. C. WAUGH     2,755,387
GROUND INDICATOR FOR CALUTRONS
Filed Dec. 5, 1944     2 Sheets-Sheet 2

INVENTOR.
Charles C. Waugh
BY
Robert A. Lavender

United States Patent Office 2,755,387
Patented July 17, 1956

2,755,387

GROUND INDICATOR FOR CALUTRONS

Charles C. Waugh, Oak Ridge, Tenn., assignor to the United States of America as represented by the United States Atomic Energy Commission Application December 5, 1944, Serial No. 566,741

1 Claim. (Cl. 250—41.9)

This invention is concerned with a means for indicating grounds or the grounded condition of an electrical element and for indicating a short or the degree of short between two electrical elements or devices. The invention is also concerned with the application of or use of the particular ground indicating means in specific apparatus wherein a process is carried out in which the ground or short condition indicated by the particular device of the invention is representative of the efficiency of the process or rather representative of a condition militating against the efficiency or effectiveness of the process.

An object of the invention is to provide an indicator for indicating a grounded or short circuited condition of an electrical element or elements, the indicator comprising an electronic tube of the type having a fluorescent screen or the like and a control electrode which causes a luminous area and an area of shadow to appear on the screen, the relative proportions of which are dependent upon the signal impressed on the control electrode, the intensity of the signal in turn being proportional to the condition which it is desired to indicate and which in this invention is the grounded or short circuited condition previously referred to. The particular indicator is ideally suited to this purpose because it can be made very sensitive to the condition in question and the particular indicator tube provides a very readily observable signal or indication as to the extent of the grounded or short circuited condition.

One form of apparatus or process in combination with which the ground indicator of my invention is particularly significant is in isotope separating apparatus of the type described in detail in the prior application of Ernest O. Lawrence, Ser. No. 557,784, filed October 9, 1944, now Patent No. 2,709,222. In this particular type of apparatus the material or substance which it is desired to separate into particular isotopes thereof is vaporized and ionized in an evacuated space and the ionized particles are caused to move in arcs of a circle under the influence of a relatively intense magnetic field resulting in a separation of the isotopes of the material, that is, ionized particles having different mass-charge properties are separated under the influence of the magnetic field and are caused to impinge upon electrodes and the segregated isotopes are then recoverable from the deposit of material on the electrodes. In this particular apparatus there may be an accumulation or deposit of material which tends to foul the electrodes to such an extent that there may be a ground, that is, one or the other of the electrodes may become grounded or the fouling may be between the two electrodes so as to produce a short circuit between them. In the operation of the separating process each of the electrodes is actually connected to ground through a current measuring instrument or in some forms of the apparatus the electrodes may be maintained at a given potential with the current measuring instruments in circuit with them for measuring the current flow. The current flow recorded is, of course, dependent upon the amount of the separated particles referred to above which impinge on the electrodes and the readings of the current measuring device in significant of the proper or improper functioning of the process and the effectiveness with which the desired isotopes are being separated and collected. If the grounded or short circuited condition described above comes about, the readings of the current measuring devices are rendered inaccurate and are than no longer significant with reference to the proper or improper functioning of the process or of its effectiveness in achieving the desired results.

It is an object therefore of my invention to provide an indicating device for accurately indicating and in a readily observable manner the extent to which the electrodes may be grounded or short circuited in apparatus such as described in the preceding paragraph.

The manner in which the objectives of my invention are achieved and further objects and numerous of the advantages of the invention will become apparent from the following detailed description and annexed drawings wherein Fig. 1 is a diagrammatic cross sectional view of an isotope separating system in which my invention is embodied.

Figures 1, 2:
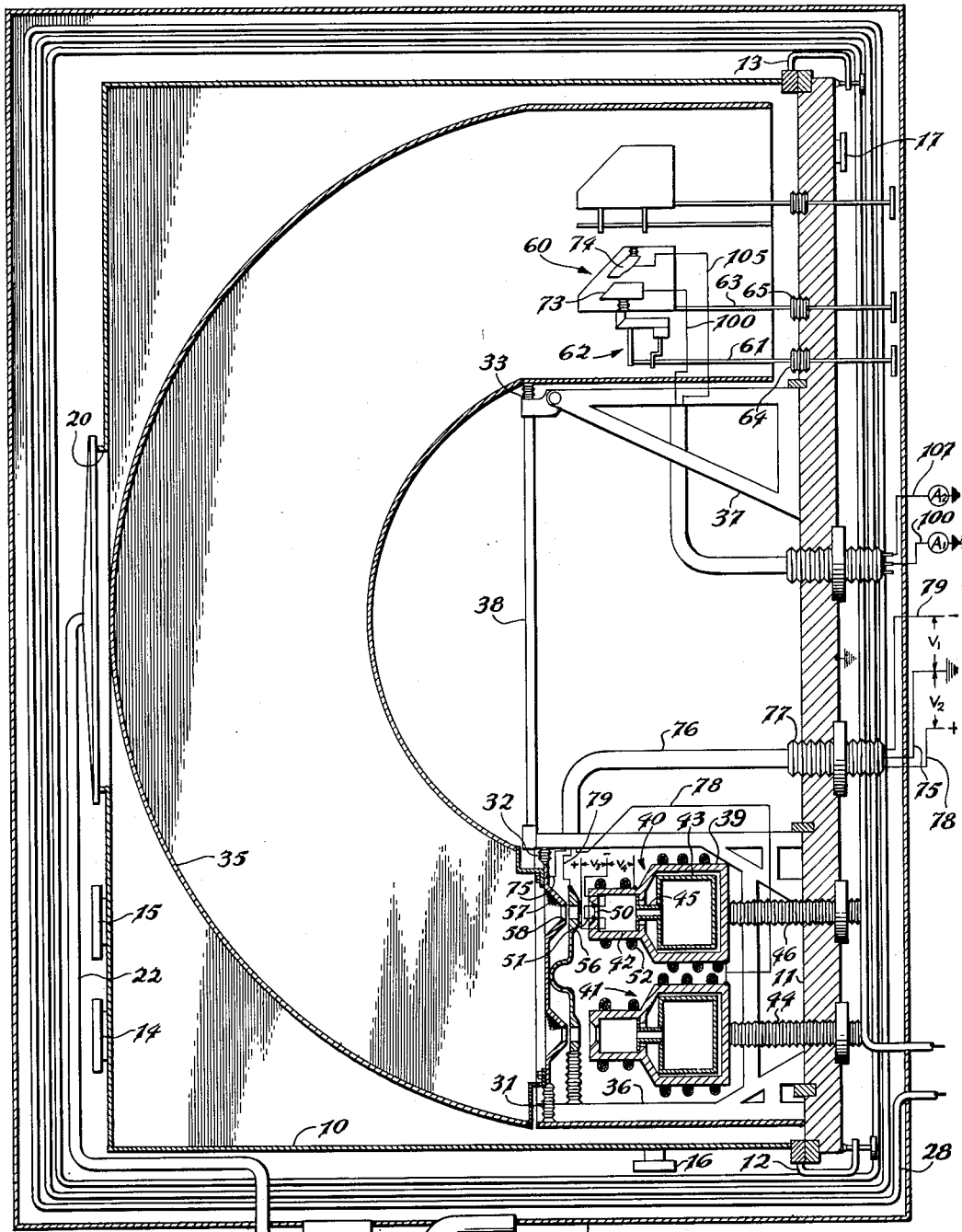
Fig. 2 is a diagrammatic end view of the apparatus of Fig. 1 showing the relationship of the electrical coil housings to the apparatus.

Fig. 1 of the drawings shows diagrammatically isotope separating equipment having the indicating device of my invention used in combination therewith to indicate the relative effectiveness with which the process is proceeding.

The apparatus of Fig. 1 is of the type disclosed in greater detail in the prior application referred to above. The apparatus of Fig. 1 includes a tank 10, the interior of which is evacuated to a relatively high degree of vacuum as will presently be described. The tank 10 is rectangular in cross section and one side is closed by a relatively heavy face plate 11 which is attachable to the tank by means of screw clamps 12 and 13, there being provided suitable bearing surfaces on face plate 11 and on the tank 10 so that when the face plate 11 is clamped in position it engages the tank in sealing relationship so as to insure against loss of vacuum at the joint. All of the mechanism within the tank 10 is attached to and carried by the face plate 11 as will presently be explained.

The tank 10 has windows 14, 15, 16 and 17 so as to make it possible to watch operations within the tank and there is a large discharge outlet 20 through which the air and moisture in the tank are evacuated. The discharge outlet 20 is connected to diffusion pump or pumps 21 by pipe 22 and the diffusion pump is connected to a mechanical pump or pumps 23 by a pipe 24. The mechanical pump 23 may be a Kinney pump, for example, which is a rotary type of pump.

The tank 10 is disposed between laminated iron cores or pole pieces 27 as shown in cross section in Fig. 2 and wound around these pole pieces are electrical windings 28, the windings being disposed within tanks or housings 29, the housings 29 being shown in cross section in Fig. 1. The windings 28 are energized with electric current so that a relatively intense magnetic field is produced which is in a direction transverse to the tank 10, that is, in a horizontal direction looking at Fig. 2 and in a direction perpendicular to the paper looking at Fig. 1. A cooling medium such as cooled oil or the like is circulated through the housing 29 for the purpose of cooling the coils therein.

Within the tank 10 is a liner structure 35 in the form of an arcuate conduit which forms a passage for a beam or beams of ions generated at the lower end of the liner and received in a receiver at the upper end of the liner. The liner 35 and the apparatus associated therewith are carried by the face plate 11 by means of a supporting structure designated by the numerals 36 and 37 and the brace member 38. The liner itself is attached to and spaced from the supporting structure by insulators 31, 32 and 33 since, as will presently be described, the liner is maintained at a different potential than the supporting structure. Within the lower right hand corner of tank 10 there are a pair of castings 40 and 41 which form containers within which the material to be ionized is vaporized. These castings are supported within the tank by insulator bushings 44 and 46 which extend through the face plate 11. In practice the insulator bushings 44 and 46 may be used for the purpose of introducing electrical leads or water cooling leads into the interior of the tank, the leads, of course, being sealed at the point where they pass into the tank. Since the structure of the castings 40 and 41 and the equipment associated with each are identical, only one will be described in detail.

The casting 40 comprises a lower portion 39 and a smaller upper portion 42, the two portions being connected by a convergent throat as shown. Within the portion 39 is a container or bottle 43 which is removable and in which the charge material itself is placed, that is, the charge of the material to be ionized. Numeral 52 designates an electric heating element or heating elements associated with container 40 which supply heat for volatilizing the charge material within the bottle 43. The supply of heat to the heating elements may be electrically controlled in various ways and if desired the supply of heat to the heaters associated with the lower part of the casting may be controlled separately from the supply to the heaters associated with the upper part of the casting. The vaporized material passes from portion 39 into portion 42 through a chimney 45.

At the left end of portion 42 there is a longitudinal slit 50 through which the vaporized material passes. Disposed at one end of this slit is a cathode 51, across the terminals of which a suitable voltage is impressed when the apparatus is in operation and as will be presently described. The function of the cathode 51 in operation is to emit a stream of electrons into and along the slit 50, the electrons being collimated into a beam under the influence of the magnetic field previously described and serving to bombard the vapor passing through the slit for the purpose of ionizing the vapor.

To the left of the casting 40, that is, above it so to speak, is a member 56 which may preferably be made of carbon and which has therein a slit parallel to the slit 50 so that the vapor emitted through the slit 50 can also pass through the slit in member 56. The electrode 56 constitutes an accelerating electrode for positive ions emerging through the slit 50 and this electrode is maintained at a relatively high negative potential as will presently be described.

The ions accelerated by the electrode 56 pass to the left, that is upwardly through another slit 57 forming a throat and the slit in this throat is also in the form of an electrode 58 made of carbon and it is maintained at ground potential but as will presently be described is negative relative to the casting 40 which is maintained at a relatively high positive potential. Positive ions after passing through the throat 57 pass into the liner structure 35 and then travel in arcs of a circle around through the liner to the receiving structure at the opposite ends of the liner; the positive ions move in arcs of a circle in this manner under the influence of the magnetic field previously described and the radii of the arcs depends upon the mass-charge properties of the ionized particles.

There are two identical receiving chambers in the upper end of the liner structure 35, one of them being designated by the numeral 60. The receiving chamber is in the form of a box having a shape which in cross section is as shown in Fig. 1 and slightly more in detail in Fig. 3. The receiver 60 may be adjusted laterally relative to the face plate 11 by stem 61 operating through linkages 62 and it may be adjusted in and out relative to the face plate by means of stem 63. The stems pass through suitable sealing devices 64 and 65 respectively associated with the face plate 11. The receiver 60 has within it a chamber 73 forming a pocket, the pocket itself constituting an electrode and ionized particles constituting one of the desired isotopes is received in this pocket, there being an opening in the top of the receiver as shown. The pocket 73 is connected to ground through a milliammeter as shown and to which reference will be made in greater detail in connection with the description of Figs. 3 and 4. The pocket 73 is supported by means of an insulator as shown within the receiver. Within the receiver 60 is another electrode 74 also supported by an insulator as shown and this electrode is so positioned within the receiver as to have ionized particles constituting another of the isotopes which it is particularly desired to collect to impinge thereon and to form a deposit thereon from which the desired isotope is recoverable. As previously explained, the ions move in arcs of a circle, the radii of which depend on the mass-charge properties of the particles and in the apparatus the magnetic field is so adjusted and the receiver is so adjusted relative thereto that the isotopes which it is desired to collect impinge upon the desired receiving element. The electrode 74 is connected to ground through a milliammeter also. The connections to electrodes 73 and 74 are through a conduit and insulator bushing similar to elements 76 and 77.

Referring again to the face plate 11, it is connected to ground as shown and the electrode 58 as well as the throat 57 and liner 35 is connected to ground by means of a conductor 75 which connects to ground as shown. The conductor 75 is led into the interior of the tank 10 through a conduit 76 which extends through the face plate 11 through a sealing insulator bushing 77. The electrode 56 is maintained at a relatively high negative potential $V_1$ by means of conductor 79 connected thereto which is also led into the interior of the tank through the conduit 76. The castings 40 and 41 are maintained at a relatively high positive potential $V_2$ by means of a conductor 78 connecting thereto, this conductor also extending through the conduit 76. From the foregoing it is to be observed that the difference in potential between the casting 40 and the electrode 58 and the liner is $V_1+V_2$. The receiver 60 itself is at ground potential and the electrodes constituted by elements 73 and 74 are substantially at ground potential.

A potential $V_3$ is impressed across the terminals of the cathode 51 and a voltage $V_4$ is impressed between the negative terminal of 51 and the casting 41 which as described above is at the potential $V_2$ so that the supply voltage $V_4$ must be insulated for the voltage $V_2$. In practice the voltage $V_4$ is relatively small as compared with $V_2$. The voltage $V_4$ serves to sustain the arc which is struck within the slit 50 during operation.

Summarizing the operation of the apparatus as so far described, the operation is that the charge material in the bottle 43 is vaporized by the heaters associated with the casting 40 and the vapor passes up into the upper portion of 42 on the casting 40. The vapor passes up through the slit 50 where it is ionized by the bombardment of the stream of electrons from the cathode 51 and an arc being formed in the slit 50 under the influence of the voltage $V_4$. Positive ions are attracted from the region of the slit by electrode 56 which as described is at a relatively high negative potential and the electrons are accelerated thereby. They pass upwardly under the influence of electrode 58 which is at ground potential, or in other words negative relative to the casting 40, and into the liner structure 35. The electrons are influenced by the magnetic field to travel in arcs of a circle around to the receiver 60, the radii of the arcs depending upon the mass-charge properties of the ionized particles. As previously explained the receiver 60 is adjusted so that the desired isotopes of the ionized material are collected in the receiver.

Various of the parts of the mechanism within the tank 10 may be cooled as desired or necessary by a suitable fluid cooling system and shielding may be provided at appropriate points to protect the mechanism from becoming coated as the result of being contacted by the vapor from the charge bottle and for protection from deterioration which may necessarily result from the process.

During the operation of the process the deposit of material in or on the electrodes 73 and 74 may be of a flaky nature and it may accumulate in such a way or the deposit may build up in such a way as to produce a ground or grounded condition between the electrodes 73 and 74 or between the electrode 74 and the upper part of the receiver 60, the spacing at these points being relatively close and susceptible to having material accumulate therebetween. The grounded or short circuited condition may also result from the accumulation of condensate from the vapor within the system. Control of the efficiency and effectiveness of the process is largely dependent upon the current flow from the electrodes 73 and 74 which depends on the impingement of the ionized particles on these electrodes. If either of them is grounded or short circuited as described above the readings of the milliammeters are, of course, not accurate and can not be relied upon. It is highly desirable and necessary therefore that if such a grounded or short circuited condition occur that the operator make himself aware of such condition and the extent of the condition. It is, of course, also desirable and necessary that such condition be eliminated as quickly as possible and this in practice is done by impressing a voltage between the electrodes 73 and 74 or between one of these electrodes and ground so as to burn out the ground or the short. The circuit arrangement for indicating the grounded or short circuited condition and for burning it out are shown in Fig. 3.

Figures 3, 4:
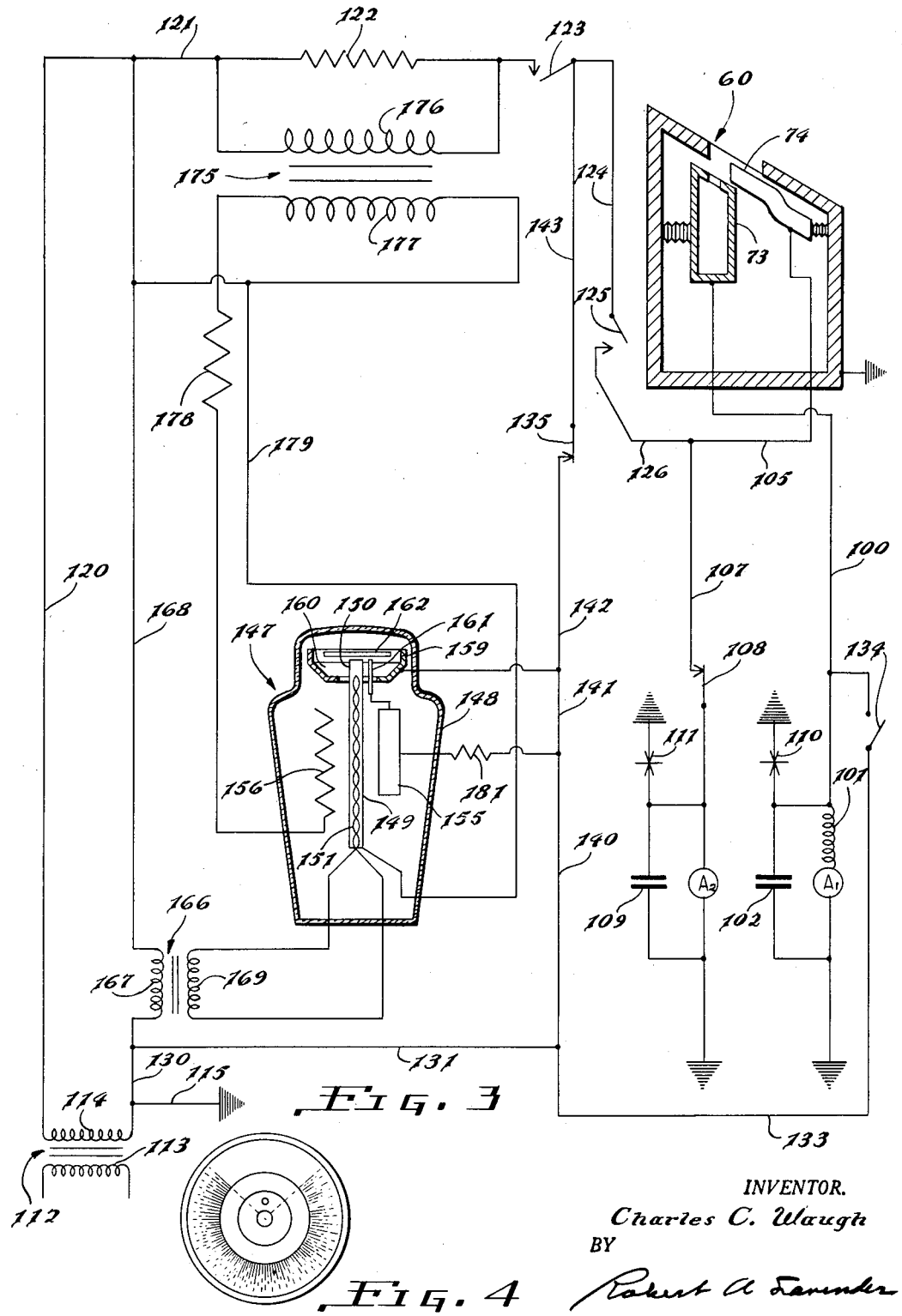
Fig. 3 is a wiring diagram showing the manner in which the grounded or short circuited condition may be indicated and eradicated.
Fig. 4 is diagrammatic view of the appearance of the indicating screen of the indicating tube of Fig. 3.

Referring now more particularly to Fig. 3, the electrode 73 is shown as being connected to ground through the wire 100 and the milliammeter $A_1$ which has a protective inductance 101 associated therewith. The milliammeter $A_1$ has a condenser 102 connected across it which is also connected to ground through a protective resistor 110 as shown. Resistor 110 is of the type having the characteristic that at a given voltage its resistance drops off substantially thus shunting and protecting the milliammeter $A_1$. The electrode 74 is similarly connected to ground through wires 105 and 107 and a manual switch 108 and through the milliammeter $A_2$. Connected across the milliammeter $A_2$ is a condenser 109 which is connected to ground through a protective resistor 111 as shown which similarly protects milliammeter $A_2$.

For burning out a ground or a short a power supply including a transformer 112 is provided, the transformer having a primary winding 113 and a secondary winding 114. One side of the secondary winding is connected to ground by wire 115 as shown. For burning out a short between the electrodes 73 and 74 these electrodes may be directly connected to the secondary winding 114 so that the voltage supplied thereby is directly between the electrodes 73 and 74. One side of the secondary winding 114 is connectable to the electrode 74 by means of a wire 120, wire 121, resistance 122, a manual switch 123, wire 124, another manual switch 125, wire 126 and wire 105. Manual switch 125 is normally open and manual switch 123 is also normally open except when it is desired to close the circuit just traced. The electrode 73 is connectable to the other side of winding 114 by means of wire 130, wire 131, wire 133, manual switch 134, and wire 100. Manual switch 134 is normally open except when it is desired to complete the circuit just traced. Numeral 135 designates another manual switch which is normally closed and which as shown is connected across the terminals of winding 114 so as to insure that the voltage of this winding could not be impressed across the electrodes 73 and 74 at undesired times. It is necessary to open the switch 135 when burning out a short between the electrodes 73 and 74. Switch 135 connects across winding 114 in part by circuits already traced and by the wires 140, 141, 142 and 143.

The voltage supplied by winding 114 is high enough so that any short existing between the electrodes 73 and 74 would be burned out by completing the circuit traced above.

If a grounded condition of electrode 74 occurs by reason of the accumulation of material between this electrode and receiver 60, it is desired to connect the voltage of winding 114 between electrode 74 and ground, that is, between electrode 74 and the receiver 60 which is grounded as shown. To accomplish this the switch 135 is opened and the switch 123 is closed and the switch 108 is opened but the switch 134 is not closed. This places the voltage of winding 114 between electrode 74 and ground, that is, between electrode 74 and receiver 60.

It will be observed that for both of the circuits described above for burning out a grounded or short circuited condition any flow of current in the circuit is through the resistance 122. In connection with the resistance 122 I provide an indicator tube 147 for indicating the degree or extent of a grounded or short circuited condition. The tube 147 is preferably of the type disclosed in greater detail in the patent of H. M. Wagner, 2,051,189. The indicator tube 147 includes an evacuated envelope 148 having therein a cathode having a lower emitting section 149 and an upper emitting section 150. The cathode is indirectly heated by a heating element 151 and associated therewith are an anode 155 and a grid 156. As is customary in the construction of tubes and as in the patent referred to above, the grid 156 and the anode 155 in practice are preferably of cylindrical or tubular construction, surrounding the cathode, the grid 156, of course, being between the cathode and the anode. The upper emitting section 150 of the cathode extends through an opening in the bottom of a dish-shaped anode element 159 which has a fluorescent coating 160 internally thereof which becomes fluorescent under electron bombardment. Adjacent the upper emitting section 150 of the cathode is a control electrode 161 which is connected to the anode 155 as shown. A cap 162 is positioned over the top of the cathode to confine the electrons to the emitting portion, the side walls of the dish-shaped anode 159 preventing electrons from reaching the glass walls of the envelope over the top thereof.

In this type of indicating tube the electrons travel radially outward from the cathode to the fluorescent coating on the anode in a wide beam. The extent of the surface of the anode reached by the electron beam is determined by the voltage on the control electrode 161. The less negative that this electrode is with respect to the anode 159, that is, the more positive with respect to emitting section 150 of the cathode the greater the area of the anode covered by the beam and the greater the area of the fluorescent portion of the anode. When the potential of the control electrode 161 is relatively positive, that is, very near the potential of the emitting section 150 of the cathode, there is a predetermined voltage, that is, potential of the control electrode 161 at which the entire surface of the anode 159 fluoresces so that the entire visible area is luminous. When the control electrode 161 becomes less positive, that is, more negative it repels electrons and a part of the beam emitted from the upper emitting portion 150 of the cathode is repelled so as to not impinge on the anode 159 and thus the entire area thereof does not fluoresce and there is a non-luminous or shadow portion such as may be seen on Fig. 4. Fig. 4 indicates diagrammatically the general appearance of the top end of the tube under such conditions.

In Fig. 3 the supply for the cathode heater 151 is from a transformer 166 having a primary winding 167 connected across the secondary winding 114 of transformer 112 by wires 130, 120 and 168, transformer 166 having a secondary 169 which connects to the cathode heater 151 as shown.

Numeral 175 designates a transformer having a primary winding 176 connected across the resistance 122 so that the voltage impressed on the primary of this transformer is the voltage drop across the resistance 122. This transformer has a secondary winding 177 which connects to the grid 156 of tube 147 through resistance 178. The other side of secondary winding 177 is connected to the cathode of tube 147 by wire 179.

Since the current which flows in the ground or short circuit described above is through the resistance 122 the voltage drop across this resistance is proportional to the extent of the grounded or short circuited condition. This voltage is impressed on the transformer 175 and the output of this transformer controls the bias on the grid 156. Normally with no current flowing through the resistance 122 there is no bias on the grid 156 and current is permitted to flow between the cathode and anode of the indicator tube 147 and thus there is a current flow in the circuit which includes the resistance 131. This circuit is through resistance 181, wires 140, 131, 130, secondary winding 114, wire 120, the connections between wires 120 and 179, and wire 179 back to the cathode of tube 147. Due to the voltage drop through this resistance the anode 155 and control electrode 161 are at a potential which is relatively negative with reference to the anode 159. Under these circumstances a part of the beam of electrons emitted by section 150 of the cathode is repelled and the entire coated surface of the anode 159 does not fluoresce and there is an area of shadow as appears in Fig. 4. This area of shadow may be of an angular extent when there is no short or ground depending upon the characteristics of the particular arrangements. In the event of a grounded or short circuited condition existing in either one of the circuits described above, such as to cause a current to flow through resistance 122 when the circuit therethrough is completed, a potential will be impressed across the primary of transformer 175 and a proportional voltage will appear across the secondary of this transformer resulting in a current flow through resistance 178. There will be a voltage drop through this resistance which will make the grid 156 more negative causing a reduction in the current flow within the indicator tube 147, that is, from the cathode to the anode 155. Thus, there will be a reduced current flow in the circuit of resistance 181 so that there will be a reduced voltage drop thereacross and the control electrode 161 will become less negative or that is, more positive so that the tendency to repel the beam of electrons emitted from the emitting section 150 of the cathode will be reduced. Thus, the luminous area as seen on Fig. 4 will increase and the area of shadow will decrease in proportion to the amount of current flowing through resistance 122 so that the luminous area as seen on Fig. 4 will directly give a visible indication of the extent of the ground or of the short depending on which of the above described circuits is completed. The characteristics of the arrangement may be so designed that the indicator tube 147 shows completely luminous, that is, there will be a complete luminous annulus under conditions of a dead ground or dead short.

In the operation of the system, therefore, by observing the indicator tube the operator of the apparatus can easily observe what the conditions are within the receiver 60 whenever he desires to check the conditions either as to a ground, speaking of electrode 74, or a short between 73 and 74. The indicator tube indicates the extent of the ground or short and, of course, as the ground or short is burned out by means of the voltage supplied by transformer 112 the indicator tube will indicate it as it is being burned out and when it has been completely eradicated.

From the foregoing those skilled in the art will observe that I have provided a very convenient and effective means for indicating visibly a grounded or short circuited condition and the extent of the grounded or short circuited condition. In connection with apparatus or processes as described, the device enables the operator to quickly and effectively make himself aware of conditions in the receiver relative to grounds or shorts and enables him to determine quickly and conveniently when such conditions have been eradicated. The operator is therefore enabled to maintain the process in efficient and effective operation a greater proportion of the time and to thereby increase the over-all production thereof.

The foregoing disclosure is representative of a preferred form of my invention and it is intended that it be interpreted in an illustrative rather than a limiting sense, it being intended that the scope of the invention be determined in accordance with the claim appended hereto.

I claim:

In a calutron, an ion receiver having an outer electrode and first and second electrodes disposed therewithin for receiving beams of ions of a charge material, meters connected to said first and second electrodes to indicate the current received by each, a current-limiting resistor, a source of burn-out voltage normally disconnected from said receiver, switch means operative to selectively connect said source through said resistor across any two of said electrodes and to disconnect said meters from said electrodes, an indicating tube embodying control, cathode, anode, and fluorescent target electrodes wherein the relative proportions of luminous and shadow areas indicated changes responsive to the voltage between said control and cathode electrodes, and a transformer having a primary circuit coupled across said current-limiting resistor and a secondary circuit coupled between said control and cathode electrodes to derive a control voltage proportional to the magnitude of burn-out current flowing through said resistor upon operation of said switch means to control the proportion of shadow and luminous areas indicated by said tube, the magnitude of said current flow and said control voltage being proportional to the resistance of said charge material disposed between the two electrodes connected to said source.

References Cited in the file of this patent

UNITED STATES PATENTS

| | | |
|---|---|---|
| 1,596,942 | Nyquist et al. | Aug. 24, 1926 |
| 2,221,467 | Bleakney | Nov. 12, 1940 |
| 2,235,173 | Shepard | Mar. 18, 1941 |
| 2,347,408 | Hanson | Apr. 25, 1944 |
| 2,355,658 | Lawlor | Aug. 15, 1944 |
| 2,378,936 | Langmuir | June 26, 1945 |
| 2,457,575 | Liebscher | Dec. 28, 1948 |

OTHER REFERENCES

Wireless World, May 1944, pages 130–132.

Oliphant et al.: Proceedings, Royal Society of London, vol. 146A, 1934, pages 922–929.